United States Patent
Yamada et al.

(10) Patent No.: US 10,214,877 B2
(45) Date of Patent: Feb. 26, 2019

(54) OPERATION SYSTEM OF WORKING MACHINE

(71) Applicant: HITACHI, LTD., Tokyo (JP)

(72) Inventors: Hiroyuki Yamada, Tokyo (JP); Saku Egawa, Tokyo (JP)

(73) Assignee: Hitachi, Ltd., Tokyo (JP)

(*) Notice: Subject to any disclaimer, the term of this patent is extended or adjusted under 35 U.S.C. 154(b) by 101 days.

(21) Appl. No.: 15/525,155

(22) PCT Filed: Jan. 28, 2015

(86) PCT No.: PCT/JP2015/052251
§ 371 (c)(1),
(2) Date: May 8, 2017

(87) PCT Pub. No.: WO2016/121010
PCT Pub. Date: Aug. 4, 2016

(65) Prior Publication Data
US 2017/0328030 A1    Nov. 16, 2017

(51) Int. Cl.
*E02F 9/20* (2006.01)
*E02F 9/26* (2006.01)
(Continued)

(52) U.S. Cl.
CPC .............. *E02F 9/205* (2013.01); *E02F 9/20* (2013.01); *E02F 9/2041* (2013.01);
(Continued)

(58) Field of Classification Search
CPC . E02F 9/20; E02F 9/2041; E02F 9/205; E02F 9/262; E02F 9/2054; E02F 3/32;
(Continued)

(56) References Cited

U.S. PATENT DOCUMENTS 4,378,132 A * 3/1983 Spies .................... E21F 7/00
299/11
4,518,285 A * 5/1985 Weber .................. E21D 23/144
299/33

(Continued)

FOREIGN PATENT DOCUMENTS

| JP | 09-37632 A | 2/1997 |
| JP | 10-063338 A | 3/1998 |
| JP | 2004-108782 A | 4/2004 |

OTHER PUBLICATIONS

International Search Report of PCT/JP2015/052251 dated May 12, 2015.
(Continued)

*Primary Examiner* — Mussa A Shaawat
(74) *Attorney, Agent, or Firm* — Mattingly & Malur, PC

(57) ABSTRACT

The present invention improves a work efficiency of an entire system for operating a plurality of working machines. An operation system of the working machine includes a work progress calculating unit 80 which calculates a work progress of a plurality of working machines or a scheduled ending time calculating unit 81 which calculates a scheduled ending time of a work by using the work progress calculated by the work progress calculating unit 80. A working machine of which an operation is switched from automatic control to remote control is determined from among the plurality of working machines by using the work progress or the scheduled ending time, and the operation system includes a centralized operation controller 43 which transmits an operation instruction to the determined working machine.

4 Claims, 11 Drawing Sheets

(51) Int. Cl.
  *G05D 1/00*   (2006.01)
  *E02F 3/32*   (2006.01)
  *G05D 1/02*   (2006.01)
(52) U.S. Cl.
  CPC ............ *E02F 9/2054* (2013.01); *E02F 9/262* (2013.01); *G05D 1/0027* (2013.01); *G05D 1/0038* (2013.01); *E02F 3/32* (2013.01); *G05D 1/0246* (2013.01); *G05D 2201/0202* (2013.01)
(58) Field of Classification Search
  CPC ............... G05D 1/0027; G05D 1/0038; G05D 2201/0202; G05D 1/0246
  See application file for complete search history.

(56) References Cited

U.S. PATENT DOCUMENTS

| | | | | |
|---|---|---|---|---|
| 6,351,697 B1* | 2/2002 | Baker | ................... | G01G 19/08 342/357.24 |
| 6,393,333 B1* | 5/2002 | Okumura | ......... | G05B 19/41865 700/114 |
| 6,778,097 B1* | 8/2004 | Kajita | ................... | E02F 3/437 340/12.5 |
| 6,830,120 B1* | 12/2004 | Yashima | ................ | A47L 11/10 15/340.1 |
| 2004/0138799 A1* | 7/2004 | Makela | .................. | G01C 21/12 701/50 |
| 2008/0091520 A1* | 4/2008 | Hatori | .................. | E02F 9/2045 705/7.12 |
| 2008/0282583 A1* | 11/2008 | Koellner | ................ | E02F 3/304 37/348 |
| 2013/0033085 A1* | 2/2013 | Wade | ..................... | E21C 35/08 299/1.4 |
| 2016/0011090 A1* | 1/2016 | Mizuochi | ............ | G01G 3/1408 73/841 |

OTHER PUBLICATIONS

Japanese Office Action received in corresponding Japanese Application No. 2016-571560 dated Mar. 13, 2018.

* cited by examiner (a)

(b)

OPERATION SYSTEM OF WORKING MACHINE

TECHNICAL FIELD

The present invention relates to an operation system of a working machine.

BACKGROUND ART

In a work site such as a mine, since automatic control of a working machine has been promoted to cut labor cost, a response to a case where the automatically-controlled working machine is stopped is required. Therefore, the automatic control is switched to remote control when the working machine is stopped, and the working machine works by the remote control until the automatic control becomes available, and after that, the remote control is switched to the automatic control. When the above process can be performed, it is possible to make the working machine work without stopping for a long time.

As a technique in consideration of the above point, there is a system in which automatic control and remote control are combined. For example, PTL 1 discloses a semi-automatic system which performs a work by switching an operation of a mobile body under automatic control or a mobile body which cannot be automatically controlled to manual control by using a plan control signal indicating that automatic control is available and a manual control signal indicating that manual control is available and which can concurrently perform remote control by a single operator.

CITATION LIST

Patent Literature

PTL 1: Japanese Published Unexamined Application No. 10-63338

SUMMARY OF INVENTION

Technical Problem

In PTL 1, there is no description on criteria to determine a mobile body to be remotely controlled from among a plurality of working mobile bodies. Therefore, it is difficult to constantly select a mobile body which has a possibility to stop working from among the plurality of mobile bodies and switch the operation of the selected mobile body to remote control. Therefore, a work efficiency of an entire system for operating a plurality of moving bodies is not improved. A purpose of the present invention is to improve a work efficiency of an entire system for operating a plurality of working machines.

Solution to Problem

For example, features of the present invention to solve the above problems are as follows.

A semi-automatic control system includes a work progress calculating unit 80 which calculates a work progress of a plurality of working machines or a scheduled ending time calculating unit 81 which calculates a scheduled ending time of a work by using the work progress calculated by the work progress calculating unit 80. Also, a working machine of which an operation is switched from automatic control to remote control is determined from among the plurality of working machines by using the work progress or the scheduled ending time, and the semi-automatic control system includes a centralized operation controller 43 which transmits an operation instruction to the determined working machine.

Advantageous Effects of Invention

According to the present invention, a work efficiency of an entire system for operating a plurality of working machines can be improved. A problem, a structure, and an effect other than the above will be obvious according to the description on the embodiments below.

DESCRIPTION OF EMBODIMENTS

Figure 1:
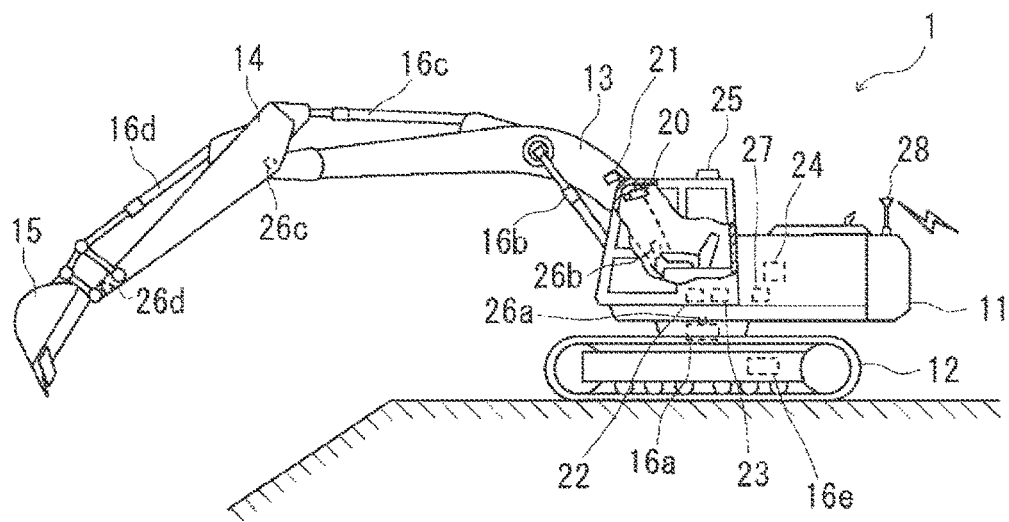
FIG. 1 is a general view of an operation system of a working machine according to a first embodiment.
Figure 1:
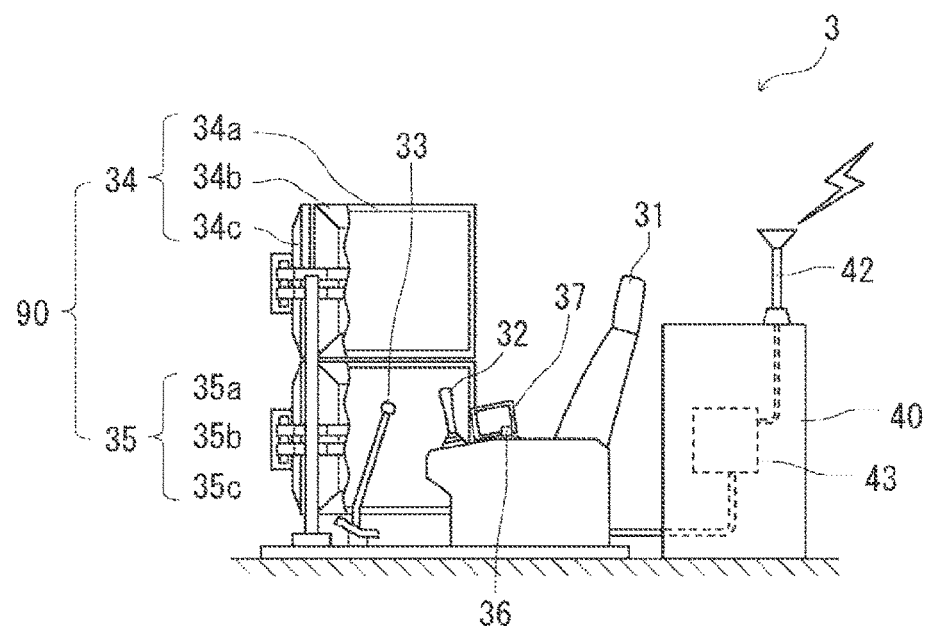

Embodiments of the present invention are described below with reference to the drawings. The following description indicates specific examples of the scope of the present invention, and the present invention is not limited to the description. The present invention can be variously changed and amended by a person skilled in the art without departing the scope of the technical idea disclosed herein. Also, in all the diagrams for the description on the present invention, components having the same function are denoted with the same reference numeral, and the repeated description on the above component may be omitted.

In the present embodiment, a hydraulic excavator is exemplified as a working machine. However, the working machine in the present invention is not limited to the hydraulic excavator. For example, the present invention can be applied to various working machines and transport vehicles such as a wheel loader and a dump truck.

First Embodiment

Figure 2:
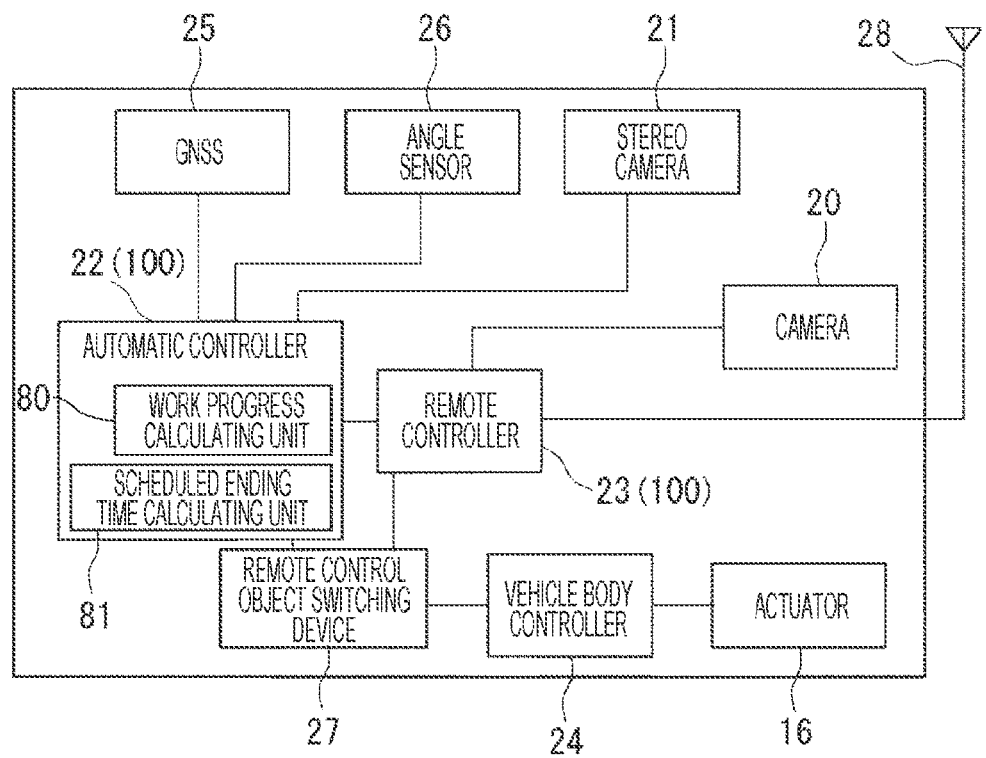
FIG. 2 is a diagram of a system structure according to the first embodiment.
Figure 2:
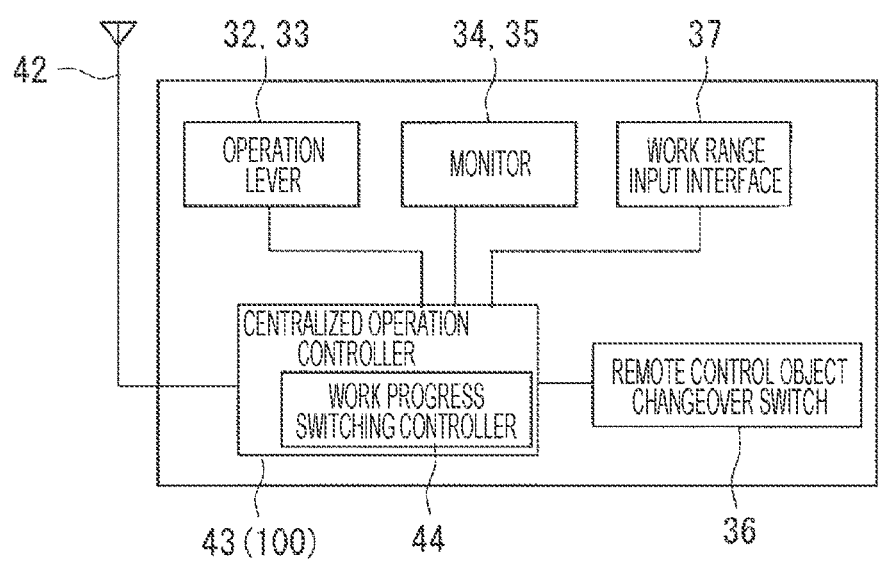
Figure 3:
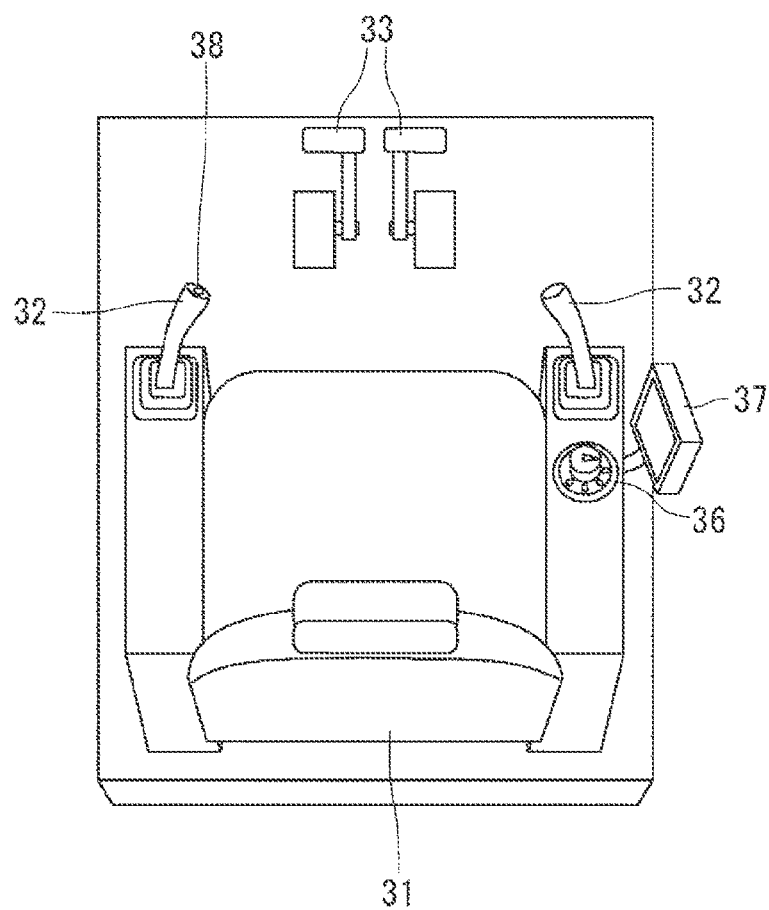
FIG. 3 is a diagram of an operation interface according to the first embodiment.

FIG. 1 is a diagram of an entire image of an operation system for a hydraulic excavator according to a first embodiment. FIG. 2 is a diagram of a system structure of the operation system in FIG. 1. FIG. 3 is a diagram of an operation interface of the operation system in FIG. 1. A structure of the operation system of the hydraulic excavator according to the first embodiment is described below with reference to FIGS. 1 to 3.

The operation system of the hydraulic excavator according to the first embodiment mainly includes three hydraulic excavators 1 to be operated and a centralized operation device 3 which is provided at a remote place and includes component parts necessary for an operation by an operator as components. For convenience of description, the number of hydraulic excavators 1 operated by the single operator is three in the present embodiment. However, the number of hydraulic excavators 1 is not limited to this. In practice, human resources of the operator can be effectively used when the single operator operates a large number of hydraulic excavators as possible. The single hydraulic excavator 1 is illustrated in figures and is mentioned in the following description. However, the other two hydraulic excavators 1 are exactly the same as the hydraulic excavator 1 to be illustrated and mentioned. Therefore, the description on the other two hydraulic excavators 1 is omitted.

Similar to a general hydraulic excavator, the hydraulic excavator 1 includes an upper turning body 11, a lower traveling body 12 including crawlers, a boom 13 including a front part for performing a work such as digging, an arm 14, a bucket 15, a turning motor 16a, a boom cylinder 16b for driving the boom 13, an arm cylinder 16c for driving the arm 14, a bucket cylinder 16d for driving the bucket 15, and a traveling motor 16e for driving right and left crawlers. The upper turning body 11 is rotatably supported by the lower traveling body 12, and the turning motor 16a relatively rotates and drives the upper turning body 11 relative to the lower traveling body 12. One end of the boom 13 is rotatably supported by the upper turning body 11, and the boom 13 is relatively rotated and driven relative to the upper turning body 11 in response to expansion and contraction of the boom cylinder 16b. One end of the arm 14 is rotatably supported by the boom 13, and the arm 14 is relatively rotated and driven relative to the boom 13 in response to expansion and contraction of the arm cylinder 16c. The bucket 15 is rotatably supported by the arm 14, and the bucket 15 is relatively rotated and driven relative to the arm 14 in response to expansion and contraction of the bucket cylinder 16d. The hydraulic excavator 1 having this structure can control the bucket 15 to an optional position and attitude and can perform a desired work by driving the turning motor 16a, the boom cylinder 16b, the arm cylinder 16c, the bucket cylinder 16d, and the turning motor 16e to appropriate positions. A vehicle body controller 24 controls each actuator (turning motor 16a, boom cylinder 16b, arm cylinder 16c, bucket cylinder 16d, and traveling motor 16e) 16, and each actuator 16 can be driven by applying a control signal for instructing an operation of each part to the vehicle body controller 24.

The hydraulic excavator 1 according to the present embodiment includes a camera 20 which is disposed in the upper turning body 11 and obtains an image viewed from the machine, a stereo camera 21 which is disposed in the upper turning body 11 and obtains shapes of an excavation object and a loading object, an automatic controller 22 which generates a control signal to automatically operate the hydraulic excavator 1, a remote controller 23 which transmits/receives the image of the camera 20 and a remote control signal to/from the centralized operation device 3, a global navigation satellite system (GNSS) 25 which obtains a position of a vehicle body, an angle sensor 26a which obtains a relative angle of the upper turning body 11 relative to the lower traveling body 12, an angle sensor 26b which obtains a relative angle of the boom 13 relative to the upper turning body 11, an angle sensor 26c which obtains a relative angle of the arm 14 relative to the boom 13, an angle sensor 26d which obtains a relative angle of the bucket 15 relative to the arm 14, a remote control object switching device 27 which switches a remote control signal with an automatic control operation signal, and a radio communication antenna 28, other than the components described above.

The automatic controller 22 obtains the shape of the excavation object by using the stereo camera 21 after grasping the position of the automatic controller 22 in a work site by the GNSS system 25. Accordingly, the shape of the excavation object in a coordinate system of the work site can be obtained. A laser sensor and a Time of Flight (TOF) distance image camera can be alternately used as the stereo camera 21. By inputting a work range and a target shape to the automatic controller 22, a position to be excavated is determined based on a difference between the current shape of the work object obtained in the work range and the target shape, and an excavation operation track of each joint such as to boom and to turn is determined. By obtaining an angle of each joint from the angle sensor 26 and performing feedback control, a control signal for moving each joint along the determined track can be generated. The automatic controller 22 includes a work progress calculating unit 80 which calculates the work progress of the work based on the information obtained from the stereo camera 21 and the camera 20 and a scheduled ending time calculating unit 81 which calculates a scheduled ending time of the work. The work end calculating unit 80 and the scheduled ending time calculating unit 81 may be included in the remote controller 23 and a centralized operation controller 43. The automatic controller 22 and the remote controller 23 may be included in the centralized operation device 3, not in the hydraulic excavator 1.

With this structure, the image viewed from the machine can be transmitted from the remote controller 23 to the centralized operation device 3 via the radio communication antenna 28. Also, the remote control signal transmitted from the centralized operation device 3 is received by the remote controller 23 via the radio communication antenna 28 and is transmitted to the vehicle body controller 24 so as to remotely control the hydraulic excavator 1. Also, the hydraulic excavator 1 can be automatically controlled by transmitting the automatic control operation signal generated by the automatic controller 22 to the vehicle body controller 24. The control signal to be transmitted to the vehicle body controller 24 can be switched by the remote control object switching device 27 according to an instruction from the remote controller 23. That is, the hydraulic excavator 1 with this structure can work through remote control by the centralized operation device 3 and also can work through the automatic control by using the remote control object switching device 27 which switches the automatic control of the hydraulic excavator 1 to the remote control or the automatic control to the remote control.

In the present embodiment, information can be transmitted between the remote control object machine and the operation device by using radio communication. However, wired communication can be used when the machine is close to the operation device. In this case, since the transmittable information quantity is increased, an image with less time delay and an image with high resolution can be transmitted and received.

The centralized operation device 3 includes a seat 31 where the operator sits, an operation lever 32 for inputting the movement of each actuator 16, an operation lever 33 for inputting the movement of the traveling motor, a monitor 34 which displays the image obtained by the camera 20, a monitor 35 which displays a state of automatic control, a remote control object changeover switch 36 which switches a remote control object machine, a work range input interface 37 from which an automatic control work range is input, an automatic control start button 38, a control box 40, a radio communication antenna 42, and the centralized operation controller 43 which is provided in the control box 40 and transmits/receives signals to/from the remote controller 23 via the radio communication antenna 42. The centralized operation controller 43 includes a work progress switching controller 44. Also, the automatic controller 22 and the remote controller 23 may include the work progress switching controller 44.

The centralized operation device 3 can receive the image and information on the automatic control state transmitted from the hydraulic excavator 1 by the centralized operation controller 43 via the radio communication antenna 42. By outputting the received information and the like to the monitors 34 and 35, the information on the hydraulic excavator 1 remote from the operator can be displayed for the operator. Also, it is possible that the control signals obtained from the operation levers 32 and 33 are obtained by the centralized operation controller 43 and the obtained control signal is transmitted to the hydraulic excavator 1 via the radio communication antenna 42. The centralized operation controller 43 may be included in the hydraulic excavator 1, not in the centralized operation device 3. The three controllers, i.e., the automatic controller 22 (100), the remote controller 23 (100), and the centralized operation controller 43 (100) may be collectively referred to as a working machine controller 100. That is, the working machine controller 100 includes the work end calculating unit 80 and the scheduled ending time calculating unit 81.

With this structure, while the operator sits on the seat 31 in the centralized operation device 3 and watches various information including the image displayed on the monitors 34 and 35, the operator can operate the hydraulic excavator 1 in a remote place by operating the operation levers 32 and 33. Also, the operator can remotely operate a single optional hydraulic excavator 1 selected from among a plurality of hydraulic excavators 1 by switching the hydraulic excavator 1 by using the remote control object changeover switch 36. Also, the operator instructs the automatic control work range and the target shape of the hydraulic excavator 1 through the work range input interface 37 and presses the automatic control start button 38 so that the hydraulic excavator 1 can be automatically controlled in the specified work range.

The monitor 34 includes three monitors, i.e., a right-side monitor 34a, a left-side monitor 34b, and a front monitor 34c, and images of the three hydraulic excavators 1 can be respectively displayed on the monitors. Similarly, the monitor 35 has three monitors 35a to 35c, and information on the automatic control state of each hydraulic excavator 1 (whether hydraulic excavator 1 is automatically controlled, excavation target shape, current shape, and the like) can be displayed on each of three monitors 35a to 35c. Each of the monitors 34 and 35 includes a work information display unit 90.

Figure 4:
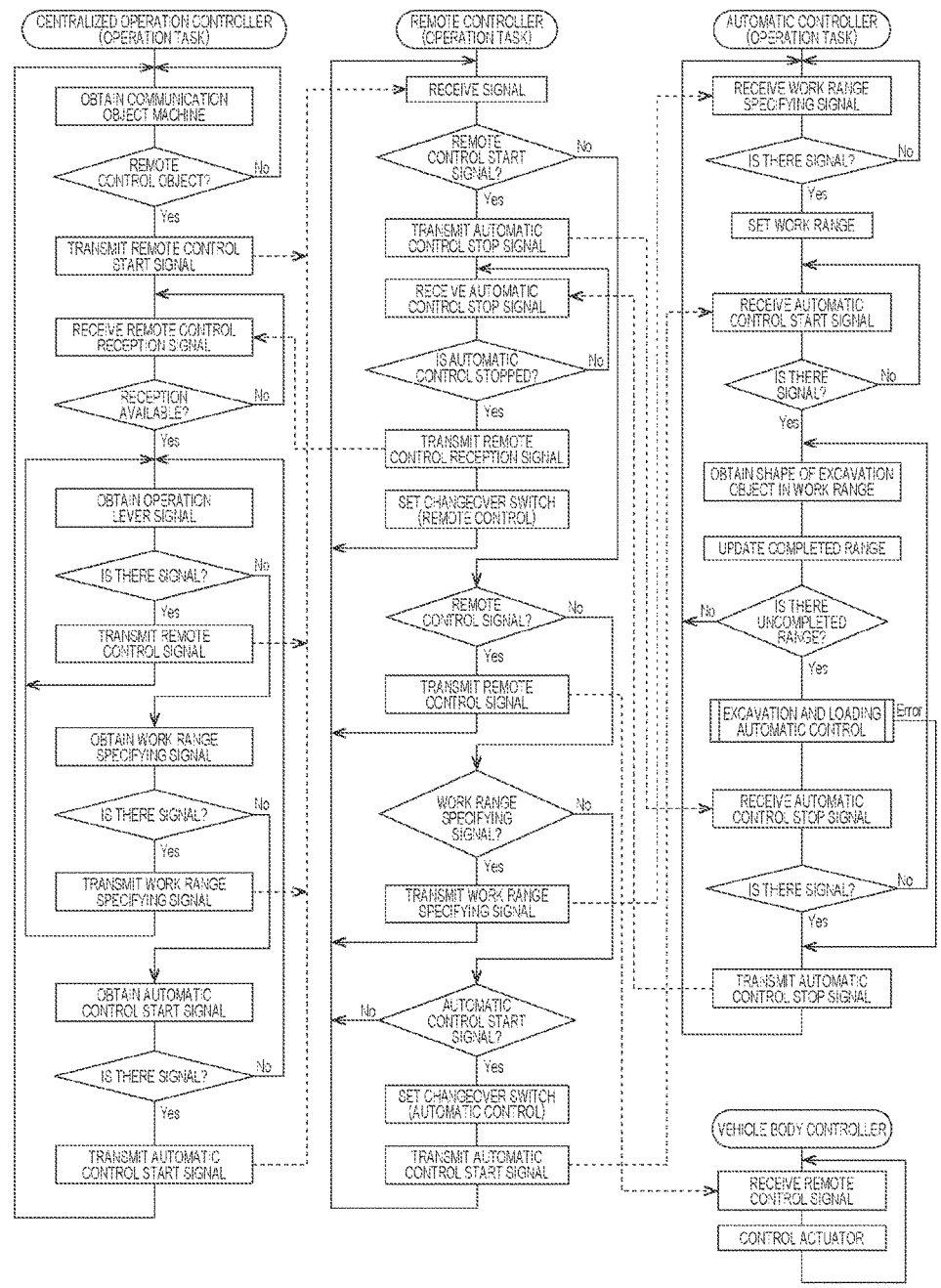
FIG. 4 is a diagram of an operation processing flow according to the first embodiment.

Next, a processing flow of an entire operation system performed in the present embodiment is described with reference to FIGS. 4 to 6.

Each of the centralized operation controller 43, the remote controller 23, and the automatic controller 22 has an operation task and a state monitoring task. The operation task is performed to transmit the control signal to the hydraulic excavator 1 so as to mainly drive the hydraulic excavator 1 by the operator, and the state monitoring task is performed to display the operation state of the hydraulic excavator 1 for the operator.

First, a processing flow of the operation task is described with reference to FIGS. 4 and 5. FIG. 4 is a diagram of an operation processing flow. The operation tasks for three hydraulic excavators 1 are concurrently processed in the centralized operation controller 43 in parallel, and each task communicates with each hydraulic excavator 1. The processing for one hydraulic excavator 1 is illustrated, and the processing flow is described. A solid line in the flowchart indicates a flow of the processing, and a dashed line indicates a movement of the signal.

First, the centralized operation controller 43 determines whether the task is a remote control object by reading a value of the remote control object changeover switch 36. When the task is not the remote control object, the centralized operation controller 43 does not perform anything. When the task is the remote control object, the centralized operation controller 43 transmits a remote control start signal to the remote controller 23 in the hydraulic excavator 1. When receiving the remote control start signal, the remote controller 23 transmits an automatic control stop signal to the automatic controller 22. Then, the remote controller 23 waits for the stop of automatic control and confirms the automatic control stop signal, and then, transmits a remote control reception signal to the centralized operation controller 43. Also, at this time, the remote control object switching device 27 switches the automatic control to the remote control. After confirming the remote control reception signal, the centralized operation controller 43 transmits a remote control signal, a work range specifying signal, or an automatic control start signal to the remote controller 23 so that the automatic control of the working machine can be switched to the remote control or the remote control can be switched to the automatic control. That is, the centralized operation device 3 includes the centralized operation controller 43 which transmits an operation instruction such as the remote control signal and the work range specifying signal to the working machine. The reason why the processing is performed in this way is because the stop of the automatic control in the middle of the work is dangerous and inefficient and the operator can more easily start remote control if the operation of the operator starts at every time when one cycle of automatic control ends.

After the centralized operation controller 43 has received the remote control reception signal and has been in the remote control reception state, the centralized operation controller 43 obtains values of the operation levers 32 and 33. When the levers are operated, the centralized operation controller 43 transmits the value of the lever to the remote controller 23. Also, when the lever is not operated, the centralized operation controller 43 subsequently confirms an output of the work range input interface 37. When the operator has completed to input the work range, the work range input interface 37 transmits the work range specifying signal to the centralized operation controller 43, and the centralized operation controller 43 transmits the work range specifying signal to the remote controller 23. Also, the centralized operation controller 43 obtains the state of the automatic control start button 38, and the centralized operation controller 43 transmits the automatic control start signal to the remote controller 23 and ends the remote control reception state when the button has been pressed.

According to the processing flow, after the centralized operation controller 43 has been in the remote control reception state, the operator can directly operate the hydraulic excavator 1 by using the operation levers 32 and 33. In addition, automatic control can be prepared by instructing the work range by using the work range input interface 37, and the hydraulic excavator 1 can be automatically controlled by pressing the automatic control start button 38. In the above description, a method for using the hydraulic excavator 1 is assumed in which the automatic control starts after the hydraulic excavator 1 is remotely controlled to a position and an attitude, where the hydraulic excavator 1 is easy to be automatically controlled, as necessary, for example, after the hydraulic excavator 1 is moved to a position where the hydraulic excavator 1 easily performs excavation. The other hydraulic excavator 1 different from the hydraulic excavator 1 which starts to be automatically controlled is switched to be remotely controlled by the remote control object changeover switch 36.

When the remote controller 23 receives the remote control signal transmitted from the centralized operation controller 43, the remote controller 23 transmits the remote control signal to the vehicle body controller 24. At this time, when the hydraulic excavator 1 is under the automatic control, the remote control object switching device 27 is connected to the side of automatic control operation and does not reach the vehicle body controller 24. However, after the automatic control has been stopped, the remote control object switching device 27 is switched to the remote control, and the remote control signal transmitted from the remote controller 23 is transmitted to the vehicle body controller 24. The vehicle body controller 24 moves each actuator as instructed by the received remote control signal. Accordingly, the operator can drive the hydraulic excavator 1 by remote control by using the operation levers 32 and 33.

When receiving the work range specifying signal transmitted from the centralized operation controller 43, the remote controller 23 transmits the work range specifying signal to the automatic controller 22. When the hydraulic excavator 1 is not under the automatic control, the automatic controller 22 waits for an automatic control start signal after receiving the work range specifying signal and setting the work range and the target shape.

When receiving the automatic control start signal transmitted from the centralized operation controller 43, the remote controller 23 transmits the automatic control start signal to the automatic controller 22. When the automatic controller 22 has waited for the automatic control start signal, the automatic controller 22 starts the automatic control in response to the signal. In the present embodiment, the content of the automatic control includes a single cycle from excavation of the excavation object to the loading of the object to a loading object. Therefore, when the automatic control starts, the automatic controller 22 obtains the shape of the excavation object in the work range from the stereo camera 21, and a completed range and an uncompleted range are estimated based on a difference between the shape of the excavation object and the target shape. When there is an uncompleted range, the automatic controller 22 transmits the control signal to the vehicle body controller 24 to perform excavation and loading automatic control.

Figure 5:
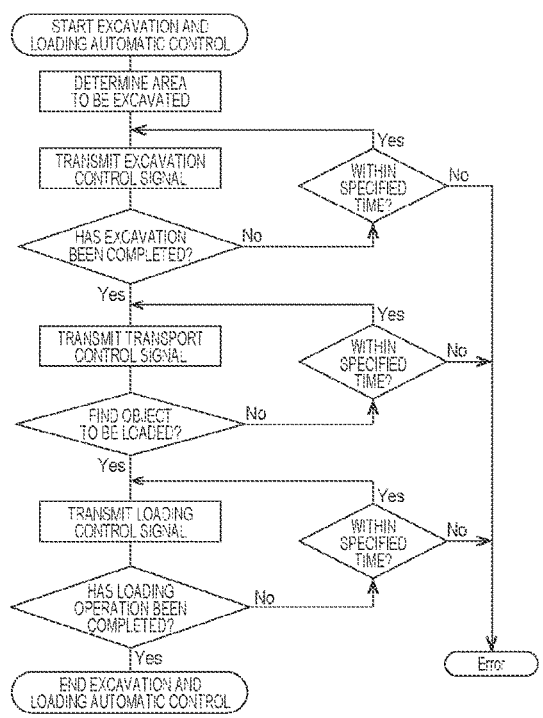
FIG. 5 is a diagram of an excavation and loading automatic control processing flow according to the first embodiment.
Figure 6:
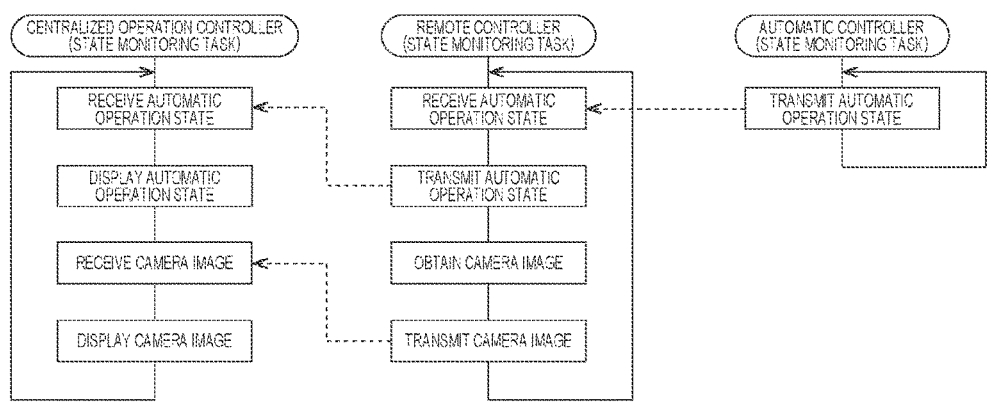
FIG. 6 is a diagram of a state monitoring processing flow according to the first embodiment.

A processing flow of the excavation and loading automatic control is illustrated in FIG. 5. First, an area to be excavated in the uncompleted range is determined, and an operation track of each joint to excavate the determined area is created. When the track is created, while feedback of each joint angle obtained from the angle sensor 26 is performed, the control signal is generated to move the joint as indicated by the track, and the control signal is transmitted to the vehicle body controller 24.

After the excavation ends, the processing proceeds to a transport operation to transport the bucket to the loading object. The loading object is, for example, a bed of a dump truck. The automatic controller 22 creates a transport operation track for turning around and generates a control signal according to the track. Then, the automatic controller 22 turns by transmitting the control signal to the vehicle body controller 24. While turning, the automatic controller 22 matches shape information obtained from the stereo camera 21 with the shape of the loading object which has been held by the automatic controller 22 in advance and searches for the loading object. When the similar shape has been found by the matching, the transport operation is stopped, and the processing is proceeded to a loading operation. The GNSS system is mounted on the loading object. When communication environment in which the hydraulic excavator 1 can obtain position information on the loading object is prepared, the position of the loading object can be immediately specified, and a transport track to the position of the loading object can be created. When the position of the loading object cannot be specified, search around the place is necessary. However, there is a possibility that the movement of the hydraulic excavator 1 becomes longer than the shortest distance according to the direction in which the hydraulic excavator 1 turns to search for the position of the loading object. Also, it is necessary for the hydraulic excavator 1 to turn while matching the shape information. Therefore, the turning speed needs to be decreased according to the processing speed of matching. On the other hand, when the position of the loading object can be previously specified, the shortest transport path can be generated, and a transport time can be minimized.

When the transport operation ends, the processing subsequently proceeds to the loading operation to load the excavation object in the bucket to the loading object. An operation track to load the object by turning the bucket is created, and a control signal is generated and transmitted to the vehicle body controller 24.

To stop the automatic control when the hydraulic excavator 1 cannot be operated due to some accidents during the automatic control, a specified time has been set for each operation. When the time of each operation exceeds the specified time, this is assumed as an error, and the automatic control is stopped. In addition, an automatic control stop signal is transmitted from the automatic controller 22 to the centralized operation controller 43 via the remote controller 23 in the state monitoring task, the automatic control error is transmitted to the operator by displaying it on the monitor 35.

Next, a processing flow of the state monitoring task is described with reference to FIG. 6. The automatic controller 22 transmits an automatic operation state to the remote controller 23. The automatic operation state includes information indicating whether the automatic control is performed or stopped, presence of generation of an error, and current excavation object shape information. The remote controller 23 transmits the received automatic operation state to the centralized operation controller 43. Also, the remote controller 23 obtains the camera image from the camera 20 and transmits the obtained image to the centralized operation controller 43. The centralized operation controller 43 displays the received camera image on the monitor 34 and displays the automatic operation state on the monitor 35. Accordingly, the operator can obtain visual information on the hydraulic excavator 1 by watching the monitor 34 and can remotely control the hydraulic excavator 1 while watching the information. Also, the movement of the hydraulic excavator 1 under the automatic control can be monitored, and the monitored movement can be used as a criterion to switch the automatic control to the remote control.

Next, an example is indicated in which the working machine of which the control is switched to the remote control is determined from among the plurality of working machines by using the calculated work progress of the working machine as a criterion to switch the automatic control of the plurality of working machines, which can be automatically and remotely controlled, to the remote control.

Figure 7:
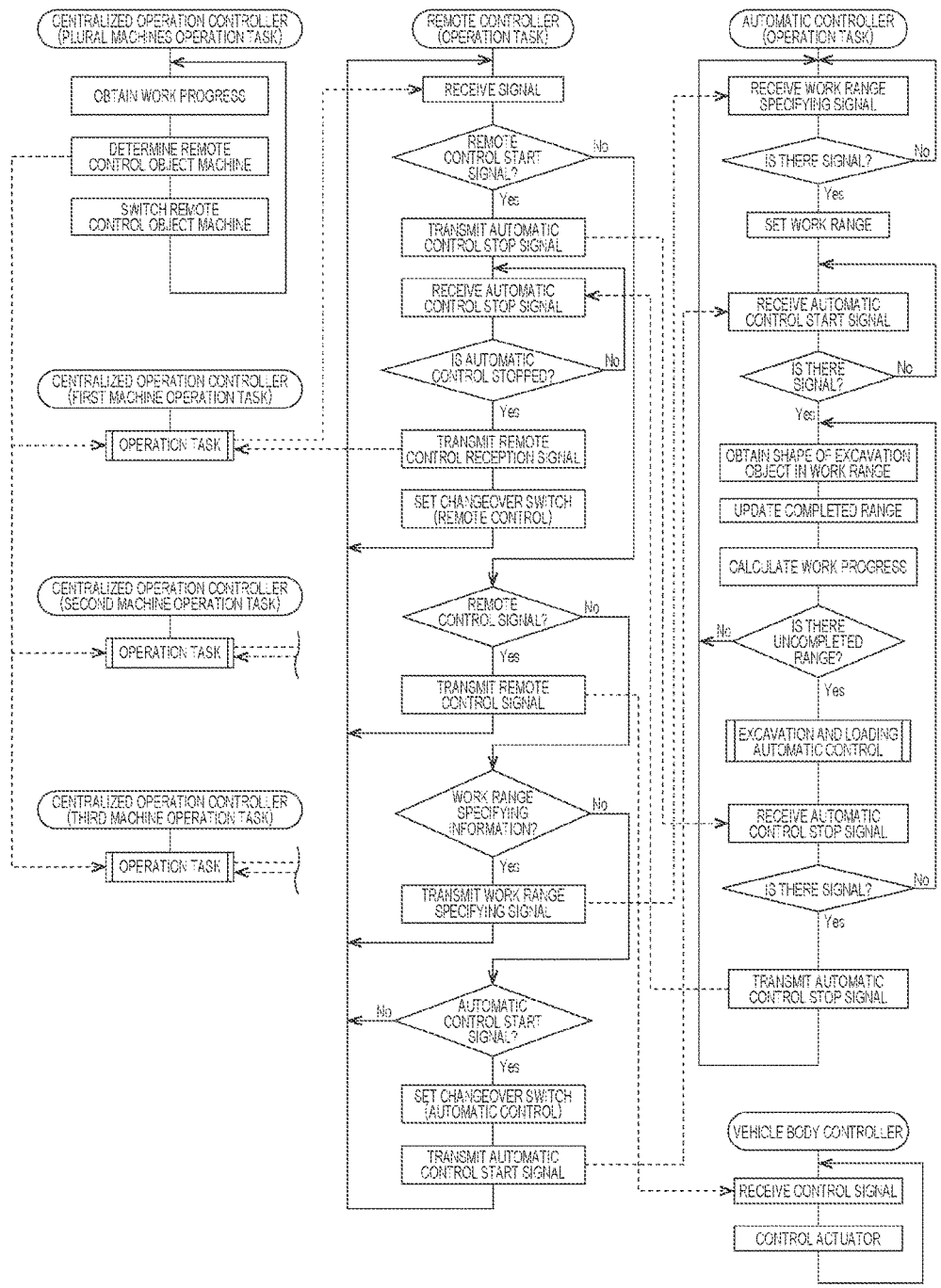
FIG. 7 is a diagram of an operation processing flow according to a second embodiment.

FIG. 7 is a diagram of an operation processing flow using the work progress. The processing flow of the remote controller 23 is the same as that described with reference to FIG. 4. Work progress calculating processing is added after the completed range updating processing described with reference to FIG. 4, and other than that, the processing flow of the automatic controller 22 is the same as that of the processing described with reference to FIG. 4. The work progress calculating processing is performed by the work progress calculating unit 80 which calculates the work progresses of the plurality of hydraulic excavators 1. Processing of a plural machines operation task performed by the centralized operation controller 43 includes work progress obtaining processing, remote control object machine determining processing, and remote control object machine switching processing. The operation task in the centralized operation controller 43 is the same as the operation task of the centralized operation controller 43 in FIG. 4.

Figure 8:
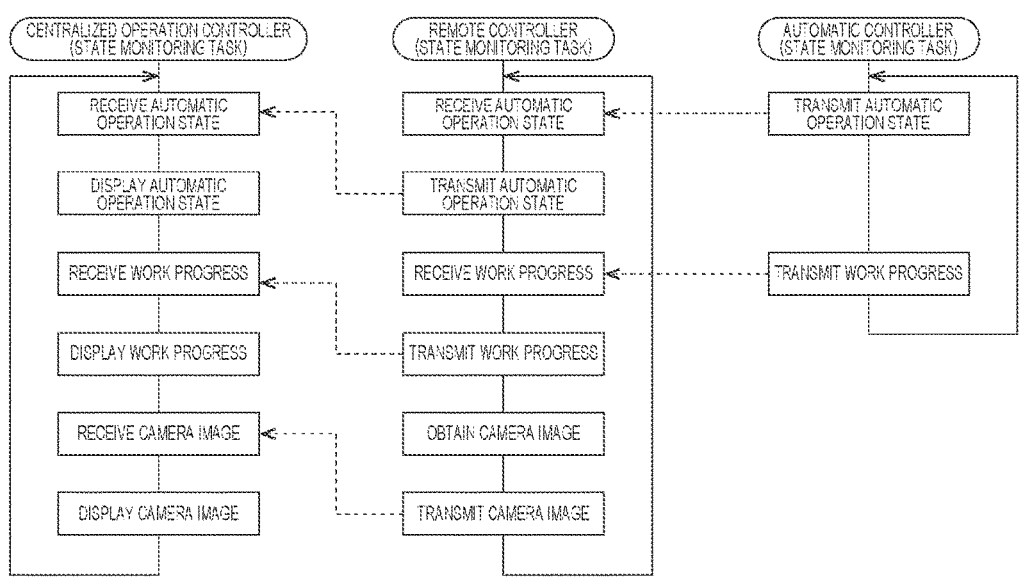
FIG. 8 is a diagram of a state monitoring processing flow according to the second embodiment.

FIG. 8 is a diagram of a state monitoring processing flow using the work progress. In a processing flow of the state monitoring task of the remote controller 23, processing for receiving the work progress from the automatic controller 22 and transmitting it to the centralized operation controller 43 is added to the state monitoring processing flow described with reference to FIG. 6. In the processing flow of the state monitoring task of the automatic controller 22, work progress transmitting processing is added to the state monitoring processing flow described with reference to FIG. 6. In a processing flow of the state monitoring task of the centralized operation controller 43, processing for receiving the work progress from the remote controller 23 and displaying it on the monitors 34 and 35 is added to the state monitoring processing flow described with reference to FIG. 6. Since each of the monitors 34 and 35 includes the work information display unit 90 which displays the work progress, the centralized operation device 3 includes the work information display unit 90 which displays the work progress.

That is, the work progress is displayed for the operator, and the automatic control of the hydraulic excavator 1 determined by the operator by using the remote control changeover switch 36 based on the displayed work progress is switched to the remote control.

The work controller 100 calculates a work progress based on object information on a work object. As a method for calculating the work progress, a method for calculating a work progress based on the object information on the work object such as a ratio of the work range and the completed range or the uncompleted range and a ratio of the current work object shape in the work range and the target shape is exemplified.

The followings can be realized according to the present embodiment described above.

While staying in an operation facility placed at a remote place, the operator can remotely control the working machine and can make an instruction to perform automatic control. The operator makes the working machine work by the automatic control, and the operator substitutionally performs the work by remotely controlling the working machine when the automatic control is not available due to a failure of the working machine or when a work progress of work under the automatic control is delayed since the excavation object is hard. Then, the operator performs the work to make the work under the automatic control be easy and newly starts automatic control. As a result, an operation time of the operator performed relative to the single working machine is shortened, and the operator can remotely operate the other working machine in a spare time in the similar way. Therefore, the single operator can make the plurality of working machines work at the same time. In addition, the operation of the working machine which ends automatic control soon is switched to the remote control and a next work range is instructed. This can prevent the working machine under the automatic control from ending the work and being stopped.

In addition, by using the work progress as a criterion to switch the automatic control to the remote control, a switching timing of the working machine can be accurately determined. Specifically, the operation system of the hydraulic excavator 1 according to the first embodiment can switch the operation of the appropriate hydraulic excavator 1 to the remote control by using the work progress as a standard to select the remote control object machine. Accordingly, the time before the switching is shortened, and a risk such that the plural hydraulic excavators 1 are concurrently end the automatic control and stopped can be reduced. The stop of the hydraulic excavator 1 causes a decrease in a work efficiency, that is, a decrease in a work efficiency of an entire system including the plurality of hydraulic excavators 1. Therefore, by switching the operation of the appropriate hydraulic excavator 1 to the remote control, the work efficiency of the entire system including the plurality of hydraulic excavators 1 can be improved.

Second Embodiment

Figure 9:
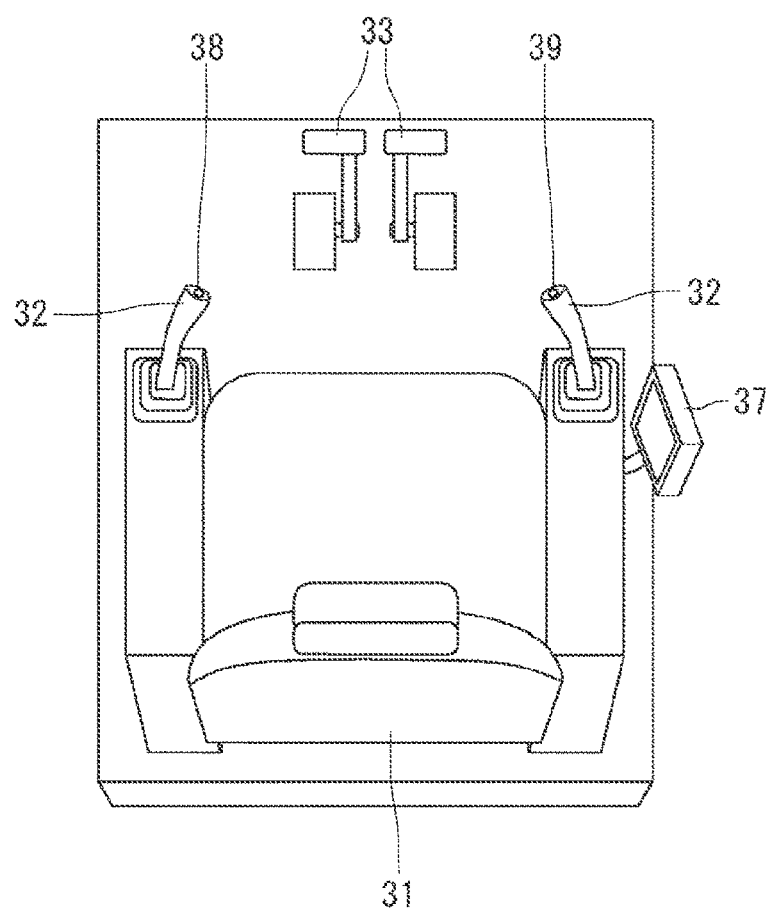
FIG. 9 is a diagram of an operation interface according to the second embodiment.

A structure of an operation interface of a hydraulic excavator 1 according to a second embodiment is illustrated in FIG. 9. The structure of the second embodiment is different from that of the first embodiment in that a remote control object switching button 39 is mounted instead of the remote control object changeover switch 36. The structure other than that is the same as that of the first embodiment.

The flow in FIG. 7 is used as an operation processing flow according to the second embodiment similarly to the first embodiment. The flow in FIG. 8 is used as a state monitoring processing flow similarly to the first embodiment.

Next, a processing flow of an operation system of the hydraulic excavator 1 according to the second embodiment is described with reference to FIGS. 7 to 9.

First, a work progress is obtained by work progress calculating processing of an operation task of an automatic controller 22 illustrated in FIG. 7.

The work progress calculated by a work progress calculating unit 80 of the automatic controller 22 is transmitted to a centralized operation controller 43 according to the state monitoring task illustrated in FIG. 8. By displaying the work progress on the work information display unit 90, the work progress is displayed for an operator.

In the plural machines operation task, the centralized operation controller 43 obtains the work progress of the plurality of hydraulic excavators 1, and the work progress switching controller 44 compares the work progresses with each other. For example, regarding the hydraulic excavator 1 having a work progress equal to or more than a certain work progress, a hydraulic excavator 1 having the largest work progress or a hydraulic excavator 1 having the smallest work progress such as a hydraulic excavator 1 which is stopped due to an error is determined as a remote control object machine. When the operator desires to switch the operating machine to the next hydraulic excavator 1, communication object machine information is transmitted to the operation task of the centralized operation controller 43 corresponding to each hydraulic excavator 1 by pressing the remote control object switching button 39, and the operation is switched to the remote control of the single hydraulic excavator 1 selected in the plural machines operation task. That is, the operation of the hydraulic excavator 1 determined based on the comparison result obtained by the work progress switching controller 44 by using the work progress calculated by the work progress calculating unit 80 is switched from the automatic control to the remote control. Since the work progress switching controller 44 compares the work progresses, it is not necessary to display the work progress on the work information display unit 90.

With the above structure, in the operation system of the hydraulic excavator 1 according to the second embodiment, in addition to the effects of the first embodiment, the optimal hydraulic excavator 1 is automatically selected at the optimal timing and the operation of the hydraulic excavator 1 can be changed to the remote control of the next hydraulic excavator 1 with an easy operation. Therefore, the time before the switching is shortened, and a risk such that the plural hydraulic excavators 1 are concurrently end the automatic control and stopped can be reduced.

Third Embodiment

As a third embodiment, an example is indicated in which a working machine of which an operation is switched to remote control is determined from among a plurality of working machines by using a work progress and a scheduled ending time obtained based on the work progress and the determined machine is remotely controlled.

Figure 10:
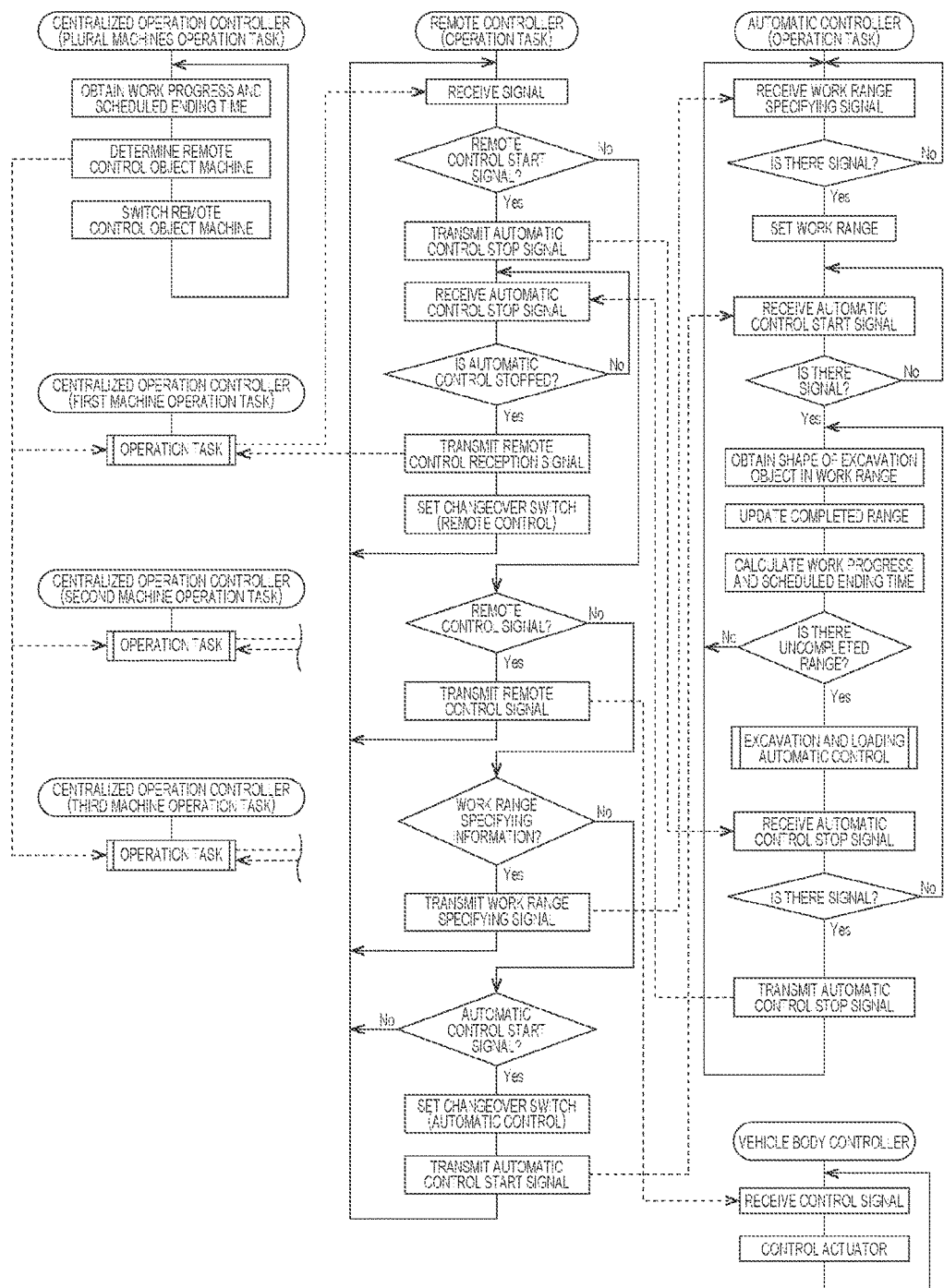
FIG. 10 is a diagram of an operation processing flow according to a third embodiment.

FIG. 10 is a diagram of an operation processing flow. A processing flow of the remote controller 23 is the same as that described with reference to FIG. 4. In a processing flow of the automatic controller 22, work progress calculating processing and scheduled ending time calculating processing are added after the completed range updating processing in FIG. 4, and other than that, the processing flow is the same as the processing flow described with reference to FIG. 4. The scheduled ending time calculating processing is performed by a scheduled ending time calculating unit 81 which calculates a scheduled ending time of a work by using a work progress calculated by a work progress calculating unit 80. Processing of a plural machines operation task of a centralized operation controller 43 includes work progress obtaining processing, scheduled ending time obtaining processing, remote control object machine determining processing, and remote control object machine switching processing. The operation task in the centralized operation controller 43 is the same as the operation task of the centralized operation controller 43 in FIG. 4.

Figure 11:
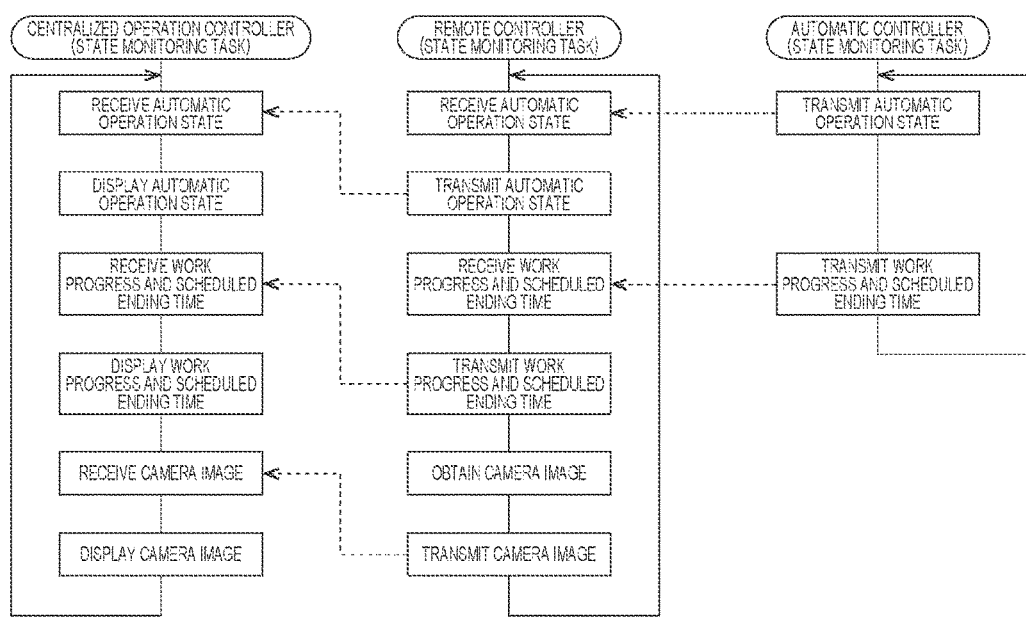
FIG. 11 is a diagram of a state monitoring processing flow according to the third embodiment.

FIG. 11 is a diagram of a state monitoring processing flow. In a processing flow of a state monitoring task of the remote controller 23, processing for receiving a work progress and a scheduled ending time from the automatic controller 22 and transmitting them to the centralized operation controller 43 is added to the state monitoring processing flow described with reference to FIG. 6. In a processing flow of the state monitoring task of the automatic controller 22, work progress transmitting processing and scheduled ending time transmitting processing are added to the state monitoring processing flow described with reference to FIG. 6. In a processing flow of the state monitoring task of the centralized operation controller 43, processing for receiving the work progress and the scheduled ending time from the remote controller 23 and displaying them on monitors 34 and 35 is added to the state monitoring processing flow described with reference to FIG. 6. The monitors 34 and 35 are work information display units 90 for displaying the work progress and the scheduled ending time.

Next, a processing flow of an operation system of a hydraulic excavator 1 according to a third embodiment is described with reference to FIGS. 10 and 11.

First, a work progress and a scheduled ending time are obtained by performing the work progress calculating processing and the scheduled ending time calculating processing in the operation task of the automatic controller 22 illustrated in FIG. 10.

Then, the work progress and the scheduled ending time respectively calculated by the work progress calculating unit 80 and the scheduled ending time calculating unit 81 of the automatic controller 22 are transmitted to the centralized operation controller 43 by the state monitoring task illustrated in FIG. 11. By displaying the work progress and the scheduled ending time on the work information display unit 90, the work progress and the scheduled ending time are displayed for the operator.

In the plural machines operation task, the centralized operation controller 43 obtains the work progress and the scheduled ending time of each hydraulic excavator 1 respectively calculated by the work progress calculating unit 80 and the scheduled ending time calculating unit 81, and the work progress switching controller 44 compares them with each other, and then, for example, a hydraulic excavator 1 having the largest work progress from among the hydraulic excavators 1 having a work progress equal to or more than a certain work progress, a hydraulic excavator 1 having the shortest scheduled ending time from among the hydraulic excavators 1 having a scheduled ending time equal to or shorter than a certain scheduled ending time, a hydraulic excavator 1 having the smallest work progress such as a hydraulic excavator 1 stopped due to an error, or a hydraulic excavator 1 having the longest scheduled ending time such as a hydraulic excavator 1 stopped due to an error is determined as a remote control object machine. When the operator desires to switch the operating machine to the next hydraulic excavator 1, the operator switches the operation of the hydraulic excavator 1 to the remote control by selecting a single hydraulic excavator 1 by using the remote control changeover switch 36 based on the work progress and the scheduled ending time displayed on the work information display unit 90. Alternatively, communication object machine information is transmitted to the operation task of the centralized operation controller 43 corresponding to each hydraulic excavator 1 by pressing the remote control object switching button 39, and the operation of the single hydraulic excavator 1 selected in the plural machines operation task is switched to the remote control. In this case, since the work progress switching controller 44 compares the work progresses and the scheduled ending times, it is not necessary to display the work progress and the scheduled ending time on the work information display unit 90. A hydraulic excavator 1 of which the operation is switched from automatic control to remote control is determined from among the plurality of hydraulic excavators 1 by using the work progress and the scheduled ending time respectively calculated by the work progress calculating unit 80 and the scheduled ending time calculating unit 81.

Figure 12:
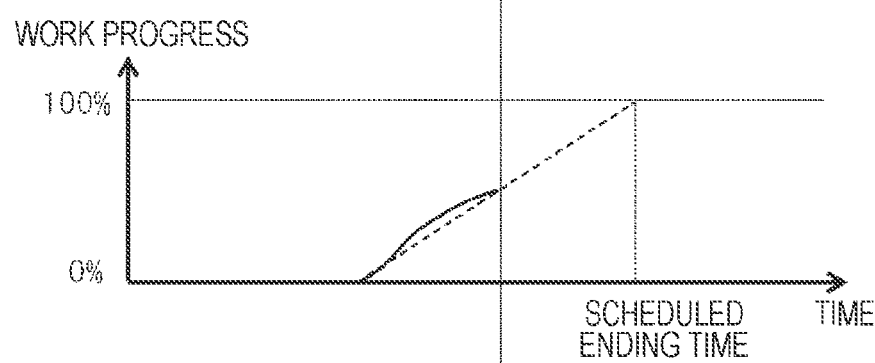
FIGS. 12(a) and 12(b) are graphs of a work progress and a scheduled ending time.
Figure 12:
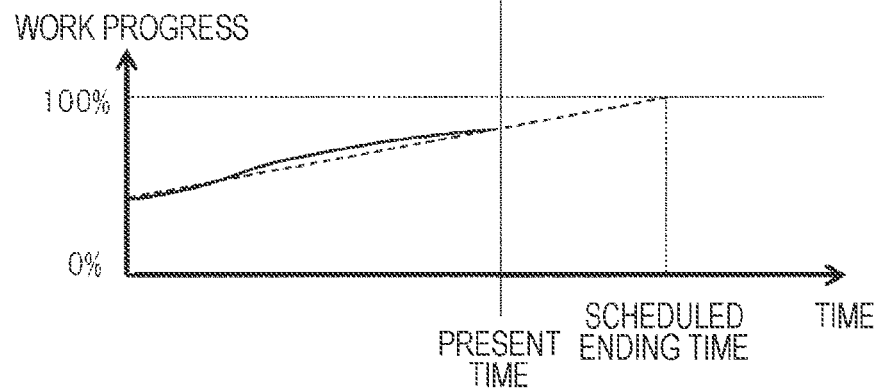

FIGS. 12(*a*) and 12(*b*) are diagrams indicating the work progress and the scheduled ending time obtained based on the work progress. The scheduled ending time may be a time when the work progress obtained based on the average increase rate of the work progress up to the present time and an increase rate of the work progress at the present time becomes 100% and may be a time obtained by other methods. In the examples in FIGS. 12(*a*) and 12(*b*), at the present time, a work progress ratio in FIG. 12(*b*) is higher than that in FIG. 12(*a*). However, when the average increase rate of the work progress to the present time is obtained and the scheduled ending time when the work progress becomes 100% is obtained based on the average increase rate, the scheduled ending time in FIG. 12(*a*) is shorter than that in FIG. 12(*b*). That is, the work illustrated in FIG. 12(*a*) ends earlier than the work illustrated in FIG. 12(*b*). In this way, there is a case where selection of the remote control object machine by using the scheduled ending time is more appropriate than that by using the work progress.

However, when the work progress of the working machine which is automatically controlled delays, for example, because the excavation object is hard or when the working machine continues to be stopped, since the scheduled ending time is the time when the work progress becomes 100%, the scheduled ending time is extended with the elapse of time. In this case, it is difficult for the operator to select a remote control object machine based on the scheduled ending time displayed on the monitor. In contrast, the value of the work progress does not decrease with the elapse of time. That is, the work progress does not back away from the goal that the work progress becomes 100%. Therefore, there is a case where the selection of the remote control object machine made by the operator based on the work progress displayed on the monitor is easier than the selection of the remote control object machine made based on the scheduled ending time. In this way, there is a case where the selection of the remote control object machine made by using the work progress is more appropriate than that made by using the scheduled ending time.

With the above structure, the operation system of the hydraulic excavator 1 according to the third embodiment can switch the operation of the more appropriate hydraulic excavator 1 to the remote control by using both the work progress and the scheduled ending time as a standard to select the remote control object machine. Accordingly, the time before the switching is shortened, and a risk such that the plural hydraulic excavators 1 are concurrently end the automatic control and stopped can be reduced. The stop of the hydraulic excavator 1 causes a decrease in a work efficiency, that is, a decrease in a work efficiency of an entire system including the plurality of hydraulic excavators 1. Therefore, by switching the operation of the appropriate hydraulic excavator 1 to the remote control, the work efficiency of the entire system including the plurality of hydraulic excavators 1 can be improved.

It is not necessary to switch the automatic control to the remote control by using both the work progress and the scheduled ending time. The hydraulic excavator 1 to be remotely controlled by the operator is determined based on the work progress or the scheduled ending time displayed on the work information display unit 90, and the hydraulic excavator 1 of which the operation is switched from the automatic control to the remote control is determined from among the plurality of hydraulic excavators 1 by using the remote control changeover switch 36 described in the first embodiment. Then, the automatic control of the hydraulic excavator 1 may be switched to the remote control.

In addition, it is preferable that the hydraulic excavator 1 of which the operation is switched from the automatic control to the remote control be determined from among the plurality of hydraulic excavators 1 by using a remote control switching button 39 described in the second embodiment based on the comparison result obtained by the work progress switching controller 44 by using the work progress or the scheduled ending time and the automatic operation of the hydraulic excavator 1 be switched to the remote control.

Since it is assumed that the working machine be the hydraulic excavator in the first to third embodiments, a comparison between the shape of the excavation object obtained by using the stereo camera 21 with the target shape is used to determine the completed range. When the working machine of which the work is mainly traveling such as a bulldozer and a dump truck is used as a working machine, a work progress is calculated based on the history of the position of the working machine and moving route information obtained by the GNSS system. That is, by assuming the range where the working machine has once (or plurality of times) passed through as the completed range based on the moving route information of the plurality of working machines, the work controller 100 can calculate the work progress. Then, the automatic control of the plurality of working machines can be switched to the remote control by using the work progress and the work ending time obtained based on the work progress.

Each of the operation systems of the working machines according to the first to third embodiments has included the hydraulic excavator 1 and the centralized operation device 3. However, the operation system of the working machine may include the centralized operation device 3.

REFERENCE SIGNS LIST

1 hydraulic excavator
20 camera
21 stereo camera
22 automatic controller
23 remote controller
24 vehicle body controller
25 GNSS system
26 angle sensor
27 remote control object switching device
28 radio communication antenna
3 centralized operation device
31 seat
32 operation lever
33 operation lever
34 monitor
35 monitor
36 remote control object changeover switch
37 work range input interface
38 automatic control start button
39 remote control object switching button
40 control box
42 radio communication antenna
43 centralized operation controller
44 work progress switching controller 80 work progress calculating unit
81 scheduled ending time calculating unit
90 work information display unit
100 working machine controller

The invention claimed is:

1. An operation system of a working machine comprising:
a work progress calculating unit configured to calculate a work progress of a plurality of working machines;
   a scheduled ending time calculating unit configured to calculate a scheduled ending time of a work by using the work progress calculated by the work progress calculating unit;
   a work progress switching controller configured to compare the work progress of the plurality of machines, wherein;
   a working machine of which an operation is switched from automatic control to remote control is determined from among the plurality of working machines by using the work progress or the scheduled ending time,
   the operation system includes a centralized operation controller which transmits an operation instruction to the determined working machine, and automatic control of the determined working machine is switched to remote control based on a comparison result obtained by the work progress switching controller.

2. The operation system of the working machine according to claim 1, wherein:
   the working machine controller configured to calculate the work progresses based on object information of work objects.

3. The operation system of the working machine according to claim 1, wherein:
   The working machine controller is configured to calculate the work progresses based on moving route information of the plurality of working machines.

4. The operation system of the working machine according to claim 2, wherein
   The working machine of which an operation is switched from automatic control to remote control is determined from among the plurality of working machines by using the work progress and the scheduled ending time.

* * * * *